US012254570B2

(12) United States Patent
Bi et al.

(10) Patent No.: US 12,254,570 B2
(45) Date of Patent: Mar. 18, 2025

(54) GENERATING THREE-DIMENSIONAL REPRESENTATIONS FOR DIGITAL OBJECTS UTILIZING MESH-BASED THIN VOLUMES

(71) Applicant: Adobe Inc., San Jose, CA (US)

(72) Inventors: Sai Bi, San Jose, CA (US); Yang Liu, Cambridge (GB); Zexiang Xu, San Diego, CA (US); Fujun Luan, Santa Clara, CA (US); Kalyan Sunkavalli, San Jose, CA (US)

(73) Assignee: Adobe Inc., San Jose, CA (US)

( * ) Notice: Subject to any disclaimer, the term of this patent is extended or adjusted under 35 U.S.C. 154(b) by 192 days.

(21) Appl. No.: 17/661,878

(22) Filed: May 3, 2022

(65) Prior Publication Data

US 2023/0360327 A1 Nov. 9, 2023

(51) Int. Cl.
*G06T 17/20* (2006.01)
*G06T 13/20* (2011.01)

(52) U.S. Cl.
CPC ............ *G06T 17/205* (2013.01); *G06T 13/20* (2013.01); *G06T 2210/21* (2013.01)

(58) Field of Classification Search
CPC ... G06T 17/205; G06T 13/20; G06T 2210/21; G06T 19/00; G06T 2210/22; G06T 17/00; G06T 7/50; G06T 17/20
See application file for complete search history.

(56) References Cited

U.S. PATENT DOCUMENTS

| 10,937,237 | B1 * | 3/2021 | Kim | G06T 7/75 |
|---|---|---|---|---|
| 11,164,343 | B1 * | 11/2021 | Batra | G06T 11/001 |
| 11,810,243 | B2 * | 11/2023 | Petkov | G06T 15/08 |
| 2006/0066608 | A1 * | 3/2006 | Appolloni | G06T 19/00 |
| | | | | 345/419 |
| 2011/0282473 | A1 * | 11/2011 | Pavlovskaia | G06T 7/13 |
| | | | | 700/98 |
| 2012/0192401 | A1 * | 8/2012 | Pavlovskaia | G06T 7/13 |
| | | | | 29/428 |
| 2018/0225862 | A1 * | 8/2018 | Petkov | G06T 15/06 |
| 2019/0043242 | A1 * | 2/2019 | Risser | G06T 15/04 |
| 2019/0043255 | A1 * | 2/2019 | Somasundaram | G06T 17/205 |
| 2019/0117268 | A1 * | 4/2019 | Pavlovskaia | G06F 30/00 |
| 2019/0236830 | A1 * | 8/2019 | Akenine-Moller | G06T 15/04 |

(Continued)

OTHER PUBLICATIONS

Mildenhall, Ben et al. "NeRF: Representing Scenes as Neural Radiance Fields for View Synthesis." ECCV (2020).

(Continued)

*Primary Examiner* — Michael Le
(74) *Attorney, Agent, or Firm* — Keller Preece PLLC

(57) ABSTRACT

The present disclosure relates to systems, methods, and non-transitory computer readable media that generate three-dimensional hybrid mesh-volumetric representations for digital objects. For instance, in one or more embodiments, the disclosed systems generate a mesh for a digital object from a plurality of digital images that portray the digital object using a multi-view stereo model. Additionally, the disclosed systems determine a set of sample points for a thin volume around the mesh. Using a neural network, the disclosed systems further generate a three-dimensional hybrid mesh-volumetric representation for the digital object utilizing the set of sample points for the thin volume and the mesh.

20 Claims, 11 Drawing Sheets

(56) References Cited

U.S. PATENT DOCUMENTS

| | | | |
|---|---|---|---|
| 2020/0054398 A1* | 2/2020 | Kovtun | G16H 40/63 |
| 2020/0184651 A1* | 6/2020 | Mukasa | G06T 7/194 |
| 2022/0245910 A1* | 8/2022 | Lombardi | G06T 13/40 |
| 2023/0076939 A1* | 3/2023 | Mammou | G06T 9/001 |

OTHER PUBLICATIONS

Baatz, H. et al.; NeRF-Tex: Neural Reflectance Field Textures, Computer Graphics forum; vol. 40 (2021), No. 4 pp. 1-13; 2021.

Lombardi, Stephen et al. "Mixture of volumetric primitives for efficient neural rendering." ACM Transactions on Graphics (TOG) 40 (2021): 1-13.

Liu, Lingjie et al. "Neural actor: neural free-view synthesis of human actors with pose control"; ACM Transactions on Graphicsvol. 40; Issue 6; Dec. 2021 Article No. 219; pp. 1-16; https://doi.org/10.1145/3478513.3480528.

J.L. Schönberger et al., Pixelwise View Selection for Unstructured Multi-view Stereo, Proceedings of the European Conference on Computer Vision, pp. 501-518, 2016.

* cited by examiner

1000

```
┌─────────────────────────────────────────────────────────────────┐
│ Generating A Mesh For A Digital Object Portrayed In A Set Of   │
│ Digital Images 1002                                             │
└─────────────────────────────────────────────────────────────────┘
                              │
                              ▼
┌─────────────────────────────────────────────────────────────────┐
│ Determining A Thin Volume Around The Mesh 1004                  │
└─────────────────────────────────────────────────────────────────┘
                              │
                              ▼
┌─────────────────────────────────────────────────────────────────┐
│ Generating A Representation For The Digital Object Using The   │
│ Thin Volume And The Mesh 1006                                   │
└─────────────────────────────────────────────────────────────────┘
```

*Fig. 10*

GENERATING THREE-DIMENSIONAL REPRESENTATIONS FOR DIGITAL OBJECTS UTILIZING MESH-BASED THIN VOLUMES

BACKGROUND

Recent years have seen significant advancement in hardware and software platforms for three-dimensional image and model rendering. For instance, systems have been developed that provide features for capturing the appearance of real-world objects and digitally recreating the appearance via three-dimensional representations. These representations can be used in a variety of applications, such as image synthesis or incorporation within a virtual reality environment. Despite such advancements, conventional systems often fail to generate accurate representations of complex real-world objects using efficient models and processes.

These, along with additional problems and issues exist with regard to conventional object representation systems.

SUMMARY

One or more embodiments described herein provide benefits and/or solve one or more of the foregoing or other problems in the art with systems, methods, and non-transitory computer-readable media that generate hybrid mesh and thin-volume representations of real-world objects for efficient neural rendering. In particular, in one or more embodiments, the disclosed systems utilize a multi-view stereo pipeline to generate, from a set of images portraying a real-world object, a proxy rough mesh for the object. The disclosed systems further build a thin volume near the surface of the proxy mesh. For instance, in some implementations, the disclosed systems build the thin volume using neural textures in the form of learned feature maps in UV space. In some embodiments, the disclosed systems build the thin volume by determining the volume density and view-dependent color of points near the mesh. In this manner, the disclosed systems efficiently generate three-dimensional representations of objects using learned thin volumes while mitigating potential errors in their corresponding meshes for improved accuracy.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 10 illustrates a flowchart of a series of acts for generating three-dimensional hybrid mesh-volumetric representation for a digital object in accordance with one or more embodiments.

DETAILED DESCRIPTION

Figure 1:
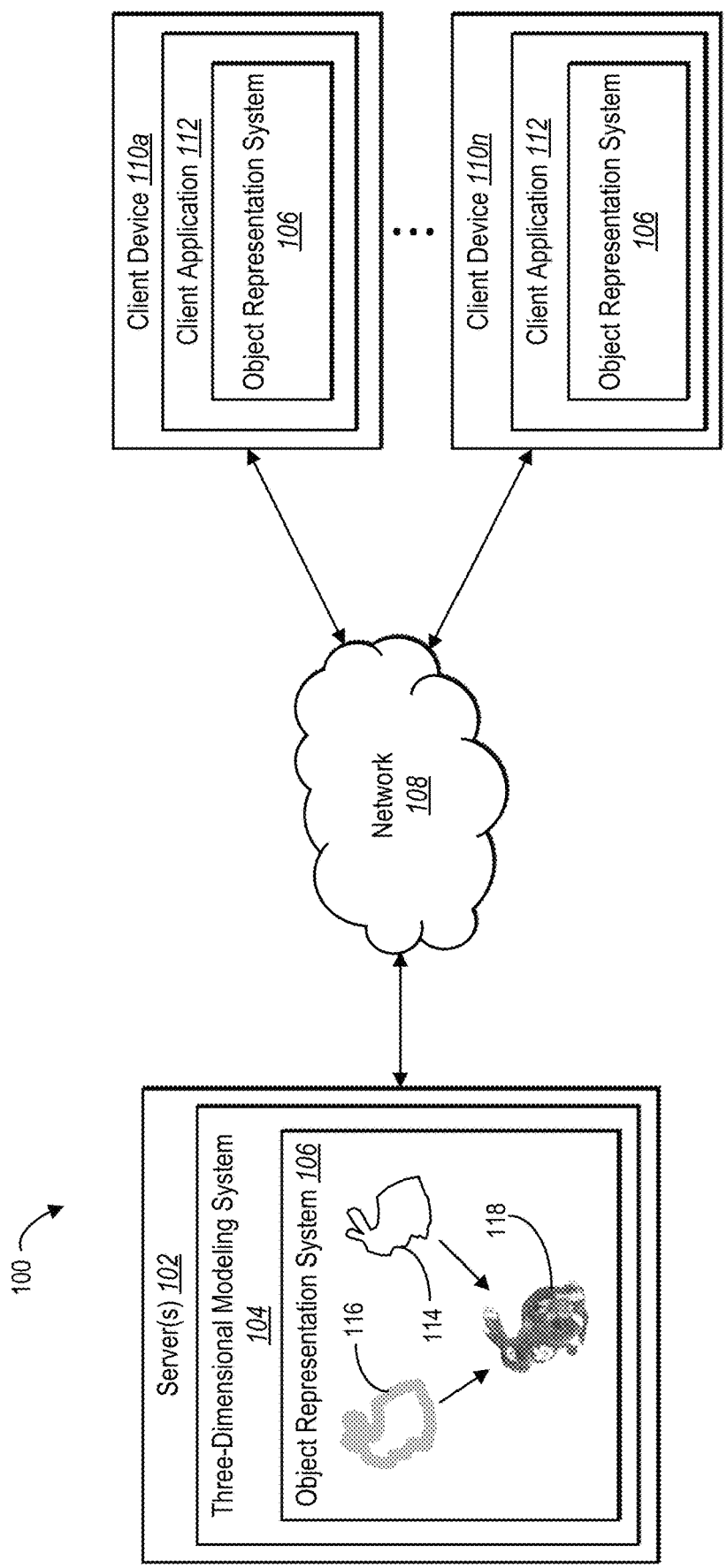
FIG. 1 illustrates an example environment in which an object representation system operates in accordance with one or more embodiments.

One or more embodiments described herein include an object representation system that generates accurate three-dimensional representations of real-world objects utilizing mesh-guided thin volumes. For instance, in one or more embodiments, the object representation system constructs a mesh for an object portrayed in a set of multi-view images using multi-view stereo. The object representation system further builds a thin volume around the mesh. For example, in some implementations, the object representation system utilizes a learnable feature map to identify neural textures for points near the mesh and utilizes the neural textures to determine the volume densities and radiances of those points. Further, in some embodiments, the object representation system registers the volume of a generated representation with the mesh so that editing or animation of the representation is performed via modification of the mesh.

As mentioned in one or more embodiments, the object representation system generates a mesh for a digital object. In particular, in some embodiments, the object representation system generates the mesh from a set of digital images that portray the digital object (e.g., in different views). For instance, in some cases, the object representation system utilizes a multi-view stereo model to generate the mesh based on the set of digital images.

As further mentioned, in one or more embodiments, the object representation system utilizes the mesh to generate a three-dimensional hybrid mesh-volumetric representation for the digital object. In particular, in some embodiments, the object representation system builds a thin volume around the mesh to create the three-dimensional hybrid mesh-volumetric representation.

For example, in some implementations, the object representation system determines a set of sample points for the thin volume. To illustrate, in some instances, the object representation system generates a ray from a source point to the mesh and samples a plurality of points along the ray. The object representation system further selects one or more of the sample points for the thin volume. For instance, in some cases, the object representation system selects one or more sample points that fall within a threshold distance of the mesh.

Additionally, in some embodiments, the object representation system determines neural textures for the thin volume. In particular, the object representation system determines neural textures for the set of sample points. For instance, in some cases, the object representation system generates (e.g., using the multi-view stereo model) a UV map for the digital object that corresponds to a learned feature map that includes feature vectors representing neural textures. Accordingly, the object representation system utilizes the UV map to identify and extract feature vectors from the learned feature map for the set of sample points. To illustrate, in at least one implementation, the object representation system extracts a feature vector for a sample point by identifying a point on the mesh that corresponds to the sample point, determining coordinates for the point within the UV map, and extracting a feature vector from the feature map that corresponds to the coordinates for that point.

In one or more embodiments, the object representation system generates the three-dimensional hybrid mesh-volumetric representation for the digital object utilizing the neural textures. In some cases, the object representation system further generates the three-dimensional hybrid mesh-volumetric representation utilizing the offset of the sample points and the direction of the one or more rays used to determine the one or more sample points. In some implementations, the object representation system generates the three-dimensional hybrid mesh-volumetric representation utilizing a neural network, such as a multi-layer perceptron. In some instances, the object representation system further renders the three-dimensional hybrid mesh-volumetric representation for display on a computing device (or causes the computing device to render the three-dimensional hybrid mesh-volumetric representation for display).

In some embodiments, the object representation system provides various additional features and applications related to digital objects. For instance, in some cases, the object representation system edits the three-dimensional hybrid mesh-volumetric representation of a digital object by editing the underlying mesh created for the digital object. Likewise, in some embodiments, the three-dimensional hybrid mesh-volumetric representation animates the three-dimensional hybrid mesh-volumetric representation by animating (e.g., deforming) the underlying mesh. In some cases, the object representation system further supports mipmaps. For example, in some instances, the object representation system generates a mipmap using a pyramid of neural textures associated with the digital object.

As mentioned above, conventional object representation systems suffer from several technological shortcomings that result in inaccurate, inefficient, and inflexible operation. For instance, many conventional systems fail to generate accurate representations for objects having a complex appearance. To illustrate, some existing systems utilize meshes to model real-world objects; however, meshes often fail to capture the complex details of many objects, such as objects with thin structures (e.g., fur or hair) or objects with heavy self-occlusion. Further, conventional systems typically fail to effectively integrate meshes into a learning pipeline, hindering their ability to improve the captured detail.

Further, conventional object representation systems often suffer from inefficiencies. For example, some conventional systems generate volumetric representations of objects using a computationally expensive process that involves over sampling empty regions around an object. Thus, many conventional systems utilize a significant amount of computing resources, such as memory and processing power, to generate a representation of an object as well as to train the models implemented in generating the representation.

In addition to inaccuracy and inefficiency problems, conventional object representation systems can also operate inflexibly. In particular, volumetric representations of digital objects are inherently difficult to edit, animate, or otherwise manipulate. Accordingly, conventional systems relying on volumetric representations typically fail to provide flexible processes for editing or animating their generated representations.

The object representation system provides several advantages over conventional systems. For example, the object representation system improves the accuracy of implementing computing devices when compared to conventional systems. In particular, the object representation system improves the accuracy with which the implementing computing devices generate representations for complex digital objects. For example, by building a thin volume around a mesh generated for a digital object, the object representation system can mitigate errors present in a mesh to improve the resulting representation of complex features, such as thin structures or portions associated with self-occlusion. Further, by utilizing a neural network in building the thin volume (e.g., generating the three-dimensional hybrid mesh-volumetric representation) based on the mesh, the object representation system integrates the mesh into a learning pipeline that can improve how the details of a digital object are represented.

Additionally, the object representation system can improve the efficiency of implementing computing devices when compared to conventional systems. For instance, by generating the thin volume using sample points that are near the mesh, the object representation system reduces the number of samples typically used by conventional systems in generating a volumetric representation. Accordingly, the object representation system utilizes fewer computing resources to generate volumetric representations. Further, as fewer samples are used, the object representation system can train the models implemented to generate the volumetric representation with better efficiency.

Further, the object representation system can improve the flexibility of implementing computing device. In particular, the object representation system provides flexibility in editing and/or animating volumetric representations of digital objects. Indeed, by modifying the three-dimensional hybrid mesh-volumetric representation of a digital object via the underlying mesh, the object representation system provides more flexible processes to implement edits and/or animations.

As illustrated by the foregoing discussion, the present disclosure utilizes a variety of terms to describe features and benefits of the object representation system. Additional detail is now provided regarding the meaning of these terms. For example, as used herein, the term "digital object" refers to a digital representation of an item or environment (e.g., person, place, or thing). In particular, in some embodiments, a digital object refers to a portrayal of a real-world object in a digital image. To illustrate, in some embodiments, a digital object includes, but is not limited to, a digital portrayal of a person, an animal, a building, a plant, a vehicle, a chair, or a handheld item.

Additionally, as used herein, the term "thin volume" refers to digital data that is utilized to represent volumetric detail of a digital object. In particular, in some embodiments, a thin volume refers to digital data that represents features of a digital object around a mesh for digital object. For instance, in some implementations, a thin volume includes digital data representing features within a threshold distance of the mesh. In one or more embodiments, a thin volume includes various levels of detail. For example, in some cases, a thin volume includes sample points within a threshold distance of the mesh. In some embodiments, a thin volume includes neural textures associated with such sample points. Further, in some implementations, a thin volume includes color values and/or volumetric densities associated with such sample points.

Further, as used herein, the term "three-dimensional hybrid mesh-volumetric representation" refers to a digital three-dimensional representation of a digital object created from a mesh and a thin volume that correspond to the digital object. In particular, in some embodiments, a three-dimensional hybrid mesh-volumetric representation refers to a digital three-dimensional model of a digital object generated using features determined from a mesh and a thin volume associated with a digital object. To illustrate, in some implementations, a three-dimensional hybrid mesh-volumetric representation includes a thin volume built around a mesh, the thin volume having color values and/or volumetric densities. Indeed, as will be described in more detail below, in some implementations, a three-dimensional hybrid mesh-volumetric representation includes a thin volume that has been modified with color values and/or volumetric densities.

As used herein, the term "neural texture" refers to one or more learned features for a digital object. In particular, in some embodiments, a neural texture refers to one or more high-level features learned for a digital object. For instance, in some cases, a neural texture includes on more high-level features learned from a set of digital images that portray a digital object. In some implementations, neural textures are represented by feature vectors of a feature map. Relatedly, as used herein, the term "pyramid of neural textures" refers to a collection of various levels of neural textures. For example, in one or more embodiments, a pyramid of neural textures includes neural textures associated with different resolutions of features learned for a digital object.

Additionally, as used herein, the term "multi-view stereo model" includes a computer-implemented model or algorithm for generating a mesh for a digital object portrayed in a set of digital images. In particular, in some embodiments, a multi-view stereo model includes a computer-implemented model or algorithm that analyzes a set of digital images that portray a digital object in various views (e.g., perspectives, orientations, etc.) and generates a mesh for the digital object based on the analysis. In one or more embodiments, a multi-view stereo model includes a pipeline or framework of multiple computer-implemented models and/or algorithms. For example, in some embodiments, a multi-view stereo model includes one or more machine learning models. In some implementations, a multi-view stereo model further generates a UV map and/or a feature map for the digital object portrayed in the set of digital images.

As used herein, the term "machine learning model" refers to a computer representation that can be tuned (e.g., trained) based on inputs to approximate unknown functions. In particular, in some embodiments, a machine learning model refers to a model that utilizes algorithms to learn from, and make predictions on, known data by analyzing the known data to learn to generate outputs that reflect patterns and attributes of the known data. For instance, in some instances, a machine learning model includes, but is not limited to a neural network (e.g., a convolutional neural network, recurrent neural network or other deep learning network), a decision tree (e.g., a gradient boosted decision tree), association rule learning, inductive logic programming, support vector learning, Bayesian network, regression-based model (e.g., censored regression), principal component analysis, or a combination thereof.

Further, as used herein, the term "neural network" refers to a model of interconnected artificial neurons (e.g., organized in layers) that communicate and learn to approximate complex functions and generate outputs based on a plurality of inputs provided to the model. In some instances, a neural network includes one or more machine learning algorithms. Further, in some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

As used herein, the term "ray" refers to a straight line representation in three-dimensional space (e.g., a line having a source and direction). In particular, in some embodiments, a ray refers to a vector. For example, in some implementations, a ray includes vector that extends outward from a source point in a straight line. Rays can include vectors of different dimensions in various embodiments.

Additionally, as used herein, the term "color value" refers to a representation of color (e.g., a red, blue, and green (RGB) value or another color value such as a CMYK value). In particular, in some embodiments, a color value refers to a RGB value (or radiance value) associated with a portion of a three-dimensional hybrid mesh-volumetric representation. For example, in some cases, a color value includes a RGB value (or radiance value) associated with a sample point determined from a mesh for a thin volume built around the mesh. In some cases, a color value includes a view-dependent color value. In other words, in some implementations, a color value associated with a portion of a three-dimensional hybrid mesh-volumetric representation changes depending on how the sample point is viewed.

Further, as used herein, the term "volume density" refers to a representation of density. In particular, in some embodiments, a volume density refers to a density value associated with a portion of a three-dimensional hybrid mesh-volumetric representation. For example, in some cases, a volume density includes a density value associated with a sample point determined from a mesh for a thin volume built around the mesh.

Additional detail regarding the object representation system will now be provided with reference to the figures. For example, FIG. 1 illustrates a schematic diagram of an exemplary system environment ("environment") 100 in which an object representation system 106 operates. As illustrated in FIG. 1, the environment 100 includes a server(s) 102, a network 108, and client devices 110a-110n.

Although the environment 100 of FIG. 1 is depicted as having a particular number of components, the environment 100 is capable of having any number of additional or alternative components (e.g., any number of servers, client devices, or other components in communication with the object representation system 106 via the network 108). Similarly, although FIG. 1 illustrates a particular arrangement of the server(s) 102, the network 108, and the client devices 110a-110n, various additional arrangements are possible.

The server(s) 102, the network 108, and the client devices 110a-110n are communicatively coupled with each other either directly or indirectly (e.g., through the network 108 discussed in greater detail below in relation to FIG. 11). Moreover, the server(s) 102 and the client devices 110a-110n include one of a variety of computing devices (including one or more computing devices as discussed in greater detail with relation to FIG. 11).

As mentioned above, the environment 100 includes the server(s) 102. In one or more embodiments, the server(s) 102 generates, stores, receives, and/or transmits data including neural networks, digital images, and three-dimensional hybrid mesh-volumetric representations. In one or more embodiments, the server(s) 102 comprises a data server. In some implementations, the server(s) 102 comprises a communication server or a web-hosting server.

In one or more embodiments, the three-dimensional modeling system 104 generates and/or edits digital three-dimensional models. For example, in some embodiments, the three-dimensional modeling system 104 generates a digital three-dimensional model (e.g., in response to user input for designing the three-dimensional model). In some cases, the three-dimensional modeling system 104 further provides tools for editing, deforming, or otherwise interacting with a generated digital three-dimensional model.

Additionally, the server(s) 102 includes the object representation system 106. In one or more embodiments, via the server(s) 102, the object representation system 106 generates three-dimensional hybrid mesh-volumetric representations for digital objects. For example, in one or more embodiments, the object representation system 106, via the server(s) 102, generates a mesh 114 for a digital object portrayed in a set of digital images. In some cases, via the server(s) 102, the object representation system 106 further determines a thin volume 116 around the mesh 114. In some embodiments, via the server(s) 102, the object representation system 106 generates a three-dimensional hybrid mesh-volumetric representation 118 (e.g., a modified thin volume) for the digital object from the mesh 114 and the thin volume 116. Example components of the object representation system 106 will be described below with regard to FIG. 9.

In one or more embodiments, the client devices 110a-110n include computing devices that can access, edit, modify, store, and/or provide, for display, digital images and/or three-dimensional hybrid mesh-volumetric representations. For example, the client devices 110a-110n include smartphones, tablets, desktop computers, laptop computers, head-mounted-display devices, or other electronic devices. The client devices 110a-110n include one or more applications (e.g., the client application 112) that can access, edit, modify, store, and/or provide, for display, digital images and/or three-dimensional hybrid mesh-volumetric representations. For example, in some embodiments, the client application 112 includes a software application installed on the client devices 110a-110n. In other cases, however, the client application 112 includes a web browser or other application that accesses a software application hosted on the server(s) 102.

The object representation system 106 can be implemented in whole, or in part, by the individual elements of the environment 100. Indeed, as shown in FIG. 1 the object representation system 106 can be implemented with regard to the server(s) 102 and/or at the client devices 110a-110n. In particular embodiments, the object representation system 106 on the client devices 110a-110n comprises a web application, a native application installed on the client devices 110a-110n (e.g., a mobile application, a desktop application, a plug-in application, etc.), or a cloud-based application where part of the functionality is performed by the server(s) 102.

In additional or alternative embodiments, the object representation system 106 on the client devices 110a-110n represents and/or provides the same or similar functionality as described herein in connection with the object representation system 106 on the server(s) 102. In some implementations, the object representation system 106 on the server(s) 102 supports the object representation system 106 on the client devices 110a-110n.

For example, in some embodiments, the server(s) 102 train one or more machine learning models described herein (e.g., a multi-view stereo model and/or a neural network). The object representation system 106 on the server(s) 102 provides the one or more trained machine learning models to the object representation system 106 on the client devices 110a-110n for implementation. Accordingly, although not illustrated, in one or more embodiments the client devices 110a-110n utilize the one or more trained machine learning models to generate three-dimensional hybrid mesh-volumetric representations.

In some embodiments, the object representation system 106 includes a web hosting application that allows the client devices 110a-110n to interact with content and services hosted on the server(s) 102. To illustrate, in one or more implementations, the client devices 110a-110n accesses a web page or computing application supported by the server(s) 102. The client devices 110a-110n provides input to the server(s) 102 (e.g., a set of digital images portraying a digital object). In response, the object representation system 106 on the server(s) 102 utilizes the trained machine learning models to generate a three-dimensional hybrid mesh-volumetric representation for the digital object. The server(s) 102 then provides the three-dimensional hybrid mesh-volumetric representation to the client devices 110a-110n.

In some embodiments, though not illustrated in FIG. 1, the environment 100 has a different arrangement of components and/or has a different number or set of components altogether. For example, in certain embodiments, the client devices 110a-110n communicate directly with the server(s) 102, bypassing the network 108. As another example, the environment 100 includes a third-party server comprising a content server and/or a data collection server.

Figure 2:
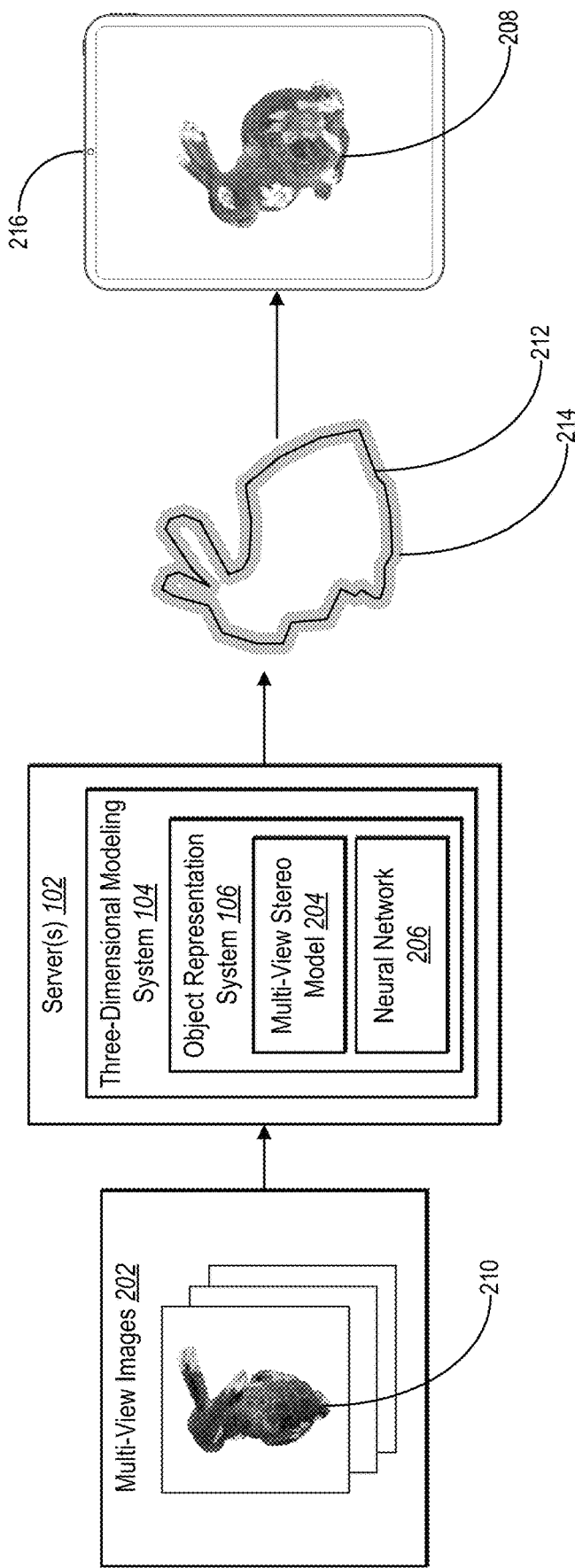
FIG. 2 illustrates an overview diagram of the object representation system generating a three-dimensional hybrid mesh-volumetric representation for a digital object in accordance with one or more embodiments.

As mentioned above, the object representation system 106 generates a three-dimensional hybrid mesh-volumetric representation for a digital object. FIG. 2 illustrates an overview diagram of the object representation system 106 generating a three-dimensional hybrid mesh-volumetric representation for a digital object in accordance with one or more embodiments.

As shown in FIG. 2, the object representation system 106 generates a three-dimensional hybrid mesh-volumetric representation 208 for a digital object 210 portrayed in a set of digital images 202. As illustrated, in one or more embodiments, the set of digital images 202 includes a multi-view collection of images. In other words, in some embodiments, each digital image from the set of digital images 202 portrays the digital object 210 with a different view (e.g., perspective, orientation, etc.) than the other digital images.

Indeed, in one or more embodiments, the object representation system 106 analyzes the set of digital images 202 and generates the three-dimensional hybrid mesh-volumetric representation 208 based on the analysis. For instance, as shown in FIG. 2, the object representation system 106 generates the three-dimensional hybrid mesh-volumetric representation 208 from the set of digital images 202 using a multi-view stereo model 204 and a neural network 206.

As further shown in FIG. 2, the object representation system 106 generates the three-dimensional hybrid mesh-volumetric representation 208 utilizing a mesh 212 (shown as the outline or contour of a projection of the mesh 212) and a thin volume 214 (shown as a volume surrounding the projected contour of the mesh 212). In particular, as will be described in more detail below, in some implementations, the object representation system 106 generates the mesh 212 for the digital object 210. Further, the object representation system 106 builds the thin volume 214 around the mesh 212. For example, in some implementations, the object representation system 106 determines some initial details (e.g., sample points) for the thin volume 214 and further modifies the thin volume 214 to generate the three-dimensional hybrid mesh-volumetric representation 208.

Further, as shown in FIG. 2, the object representation system 106 provides the three-dimensional hybrid mesh-volumetric representation 208 for display on a client device 216. In one or more embodiments, the object representation system 106 further renders the three-dimensional hybrid mesh-volumetric representation 208 for display on the client device 216. To illustrate, in one or more embodiments, the object representation system 106 operating on the server(s) 102 renders the three-dimensional hybrid mesh-volumetric representation 208 and provides the rendering to the client device 216 for display. In some cases, the object representation system 106 transmits the three-dimensional hybrid mesh-volumetric representation 208 from the server(s) 102 to the client device 216 and causes the client device 216 to render the three-dimensional hybrid mesh-volumetric representation 208. In some implementations, the object representation system 106 operates on the client device 216 to generate and/or render the three-dimensional hybrid mesh-volumetric representation 208 for display.

Figure 3:
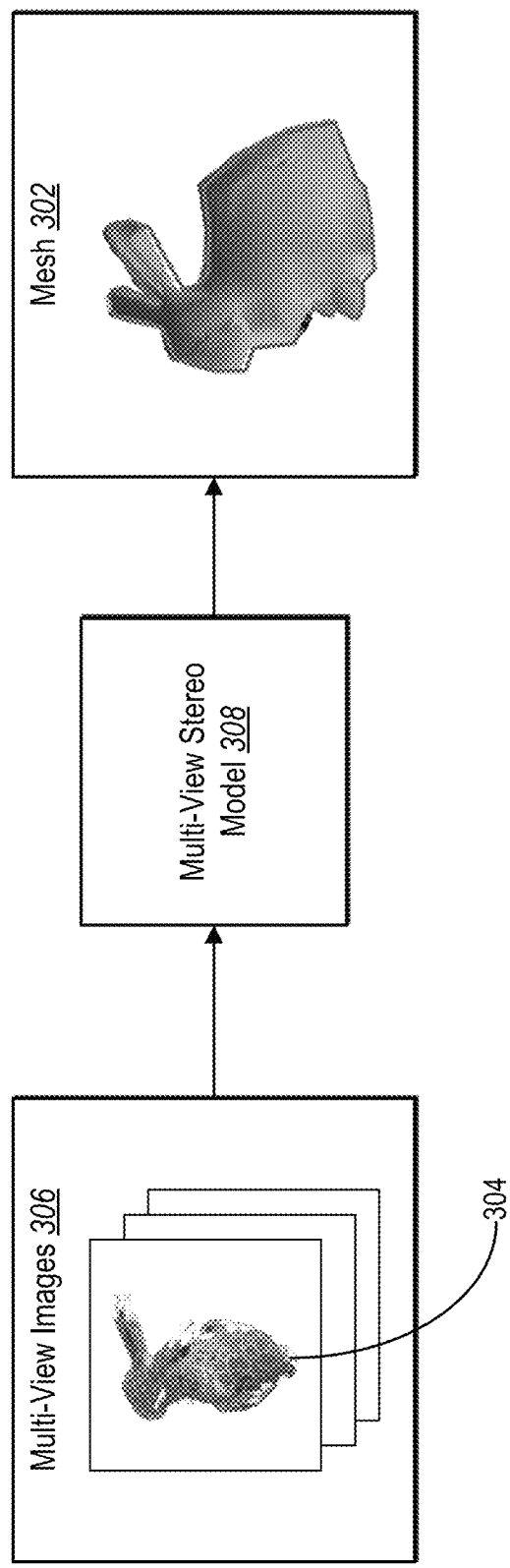
FIG. 3 illustrates a diagram for generating a mesh for a digital object in accordance with one or more embodiments.

As mentioned, the object representation system 106 generates a mesh for a digital object. FIG. 3 illustrates a diagram for generating a mesh for a digital object in accordance with one or more embodiments.

As shown in FIG. 3, the object representation system 106 generates a mesh 302 for a digital object 304 portrayed in a set of digital images 306 (e.g., multi-view images). In particular, as shown, the object representation system 106 generates the mesh 302 from the set of digital images 306. In other words, in some implementations, the object representation system 106 analyzes the set of digital images 306 and generates the mesh 302 based on the analysis (e.g., based on the portrayal of the digital object 304 in the set of digital images 306). Thus, in some implementations, the object representation system 106 utilizes the different views provided by the set of digital images 306 in constructing the mesh 302.

As illustrated by FIG. 3, the object representation system 106 constructs the mesh 302 from the set of digital images 306 using a multi-view stereo model 308. In one or more embodiments, the object representation system 106 utilizes, as the multi-view stereo model 308, the open source COL-MAP model described by J. L. Schönberger et al., *Pixelwise View Selection for Unstructured Multi-view Stereo*, Proceedings of the European Conference on Computer Vision, pp. 501-518, 2016, which is incorporated herein by reference in its entirety. It should be noted, however, that the object representation system 106, however, can utilize one of various alternatives in other embodiments.

As further mentioned above, the object representation system 106 builds a thin volume around a mesh generated for a digital object. For example, in some instances, the object representation system 106 determines a set of sample points for the thin volume. In some embodiments, the object representation system 106 further determines feature vectors representing neural textures for the set of sample points and utilizes the feature vectors to determine color values and volume densities for the sample points.

Figure 4:
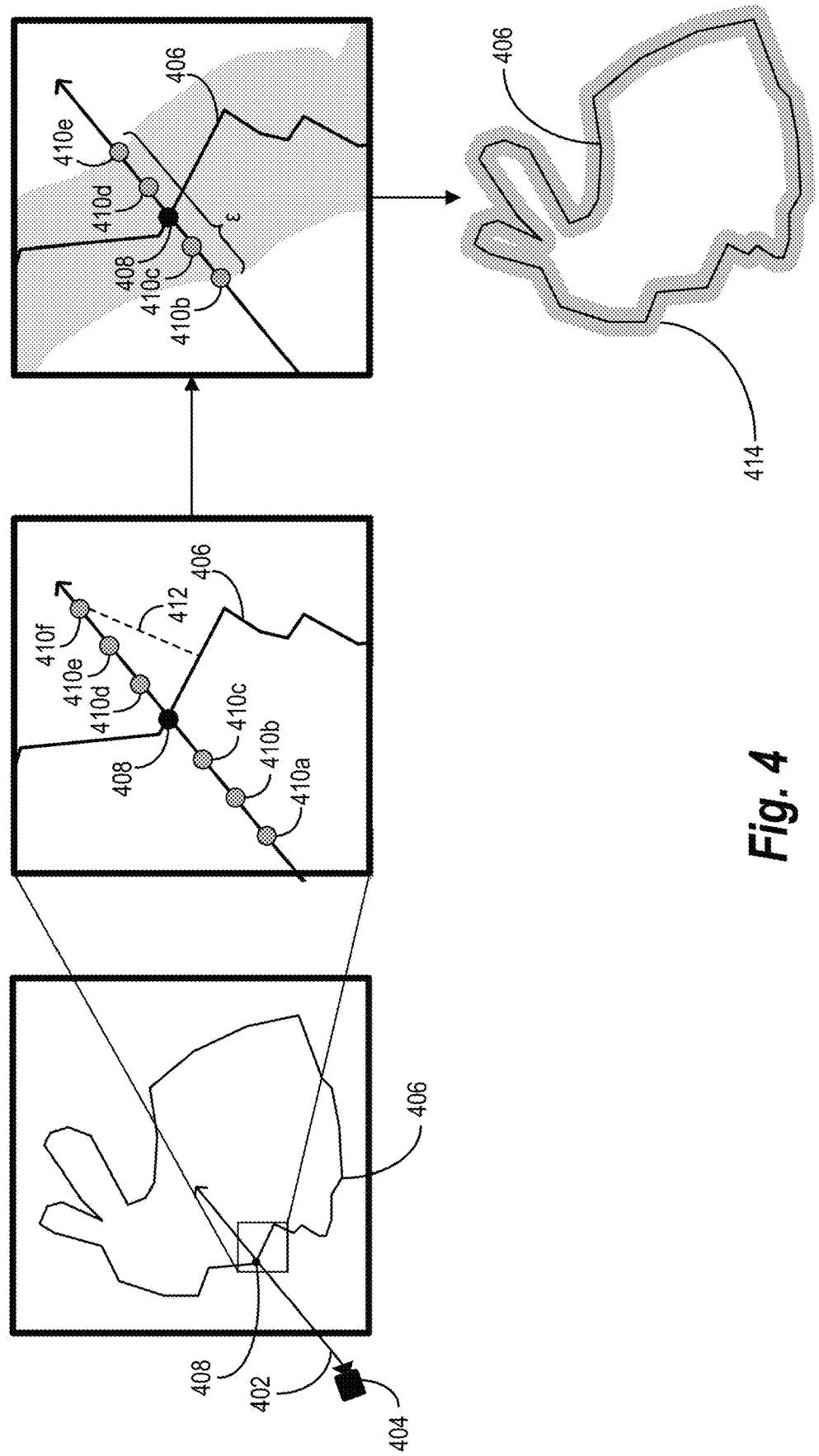
FIG. 4 illustrates a diagram for determining a set of sample points for a thin volume around a mesh in accordance with one or more embodiments.

FIG. 4 illustrates a diagram for determining a set of sample points for a thin volume around a mesh in accordance with one or more embodiments. In particular, FIG. 4 illustrates the object representation system 106 determining one or more sample points for the set of sample points by generating a ray 402 from a source point 404 to the mesh 406 (e.g., having a direction represented by $(\theta, \phi)$). As illustrated, the ray 402 intersects the mesh 406 at a location 408 on the mesh 406. In some implementations, the ray 402 intersects the mesh 406 at a plurality of locations.

As shown in FIG. 4, the object representation system 106 further samples a plurality of points 410a-410f along the ray. In one or more embodiments, the object representation system 106 samples the plurality of points 410a-410f randomly or semi-randomly along the ray 402. For instance, in some cases, the object representation system 106 samples a pre-determined number of points at random or semi-random locations along the ray 402. In some implementations, the object representation system 106 randomly or semi-randomly samples a first point on the ray 402 and then samples the other points at regular distances along the ray 402 on either side of the first sampled point. In some embodiments, the object representation system 106 samples the plurality of points 410a-410f at regular intervals based on the location 408 at which the ray 402 intersects the mesh 406.

Additionally, in one or more embodiments, the object representation system 106 selects one or more points from the plurality of points 410a-410f to include in the set of sample points (e.g., to use as sample points) for the thin volume around the mesh 406. For instance, in some embodiments, the object representation system 106 selects a point to include in the set of sample points based on a distance between the point and the mesh 406. Indeed, in some implementations, the object representation system 106 determines the distance between each point from the plurality of points 410a-410f and the mesh 406. For example, in some cases, the object representation system 106 determines the distance between a point and a closest point on the mesh (e.g., a closest distance).

To illustrate, in one or more embodiments, the object representation system 106 determines the distance between point 410f and the mesh 406 to include the distance represented by the dashed line 412. Accordingly, the object representation system 106 identifies the closest point on the mesh 406 and determines the distance between the point 410f and that point on the mesh 406.

In one or more embodiments, the object representation system 106 determines to include a point within the set of sample points for the thin volume if the point is within a threshold distance of the mesh 406. For example, in some embodiments, the object representation system 106 compares the determined distance between the point and the mesh 406 to a threshold distance. In some cases, upon determining that the point is within the threshold distance based on the comparison, the object representation system 106 includes the point as a sample point within the set of sample points. Likewise, in some embodiments, the object representation system 106 excludes the point from the set of sample points upon determining that the point is located outside the threshold distance based on the comparison. In one or more embodiments, the threshold distance is configurable. In other words, the object representation system 106 utilizes a parameter for the threshold distance and modifies the parameter based on one or more factors (e.g., user input or features of the digital object).

Thus, as shown in FIG. 4, the object representation system 106 selects the points 410b-410e for inclusion within the set of sample points. In other words, the object representation system 106 determines that the points 410b-410e are within a threshold distance to the mesh 406 while the point 410a and the point 410f are located outside the threshold distance to the mesh 406. Based on selecting the points 410b-410e for inclusion within the set of sample points, the object representation system 106 determines a thin volume around the corresponding portion of the mesh 406 having a thickness ε.

In one or more embodiments, the object representation system 106 similarly generates a plurality of additional rays from the source point 404 (or other source points) to the mesh 406, where the additional rays have different directions than the ray 402. The object representation system 106 samples points along the rays, compares the distances between the points and the mesh 406 to a threshold distance, and selects the points that fall within the threshold distance. Accordingly, the object representation system 106 determines a set of sample points for the thin volume 414 around the mesh 406.

In some cases, the object representation system 106 utilizes a pre-determined number of rays for determining the set of sample points. In some cases, the object representation system 106 generates rays using a set of pre-determined directions or at least using pre-determined direction intervals. For instance, in some embodiments, for each pixel in the images, the object representation system 106 generates a ray that corresponds to the pixel using extrinsic and intrinsic information of the source point 404 (e.g., the camera). In one or more embodiments, the number of rays and their directions or direction intervals are configurable. Indeed, in some cases, the object representation system 106 utilizes parameters for the number of rays and their directions or direction intervals and modifies the parameter based on one or more factors (e.g., user input or features of the digital object).

Figure 5:
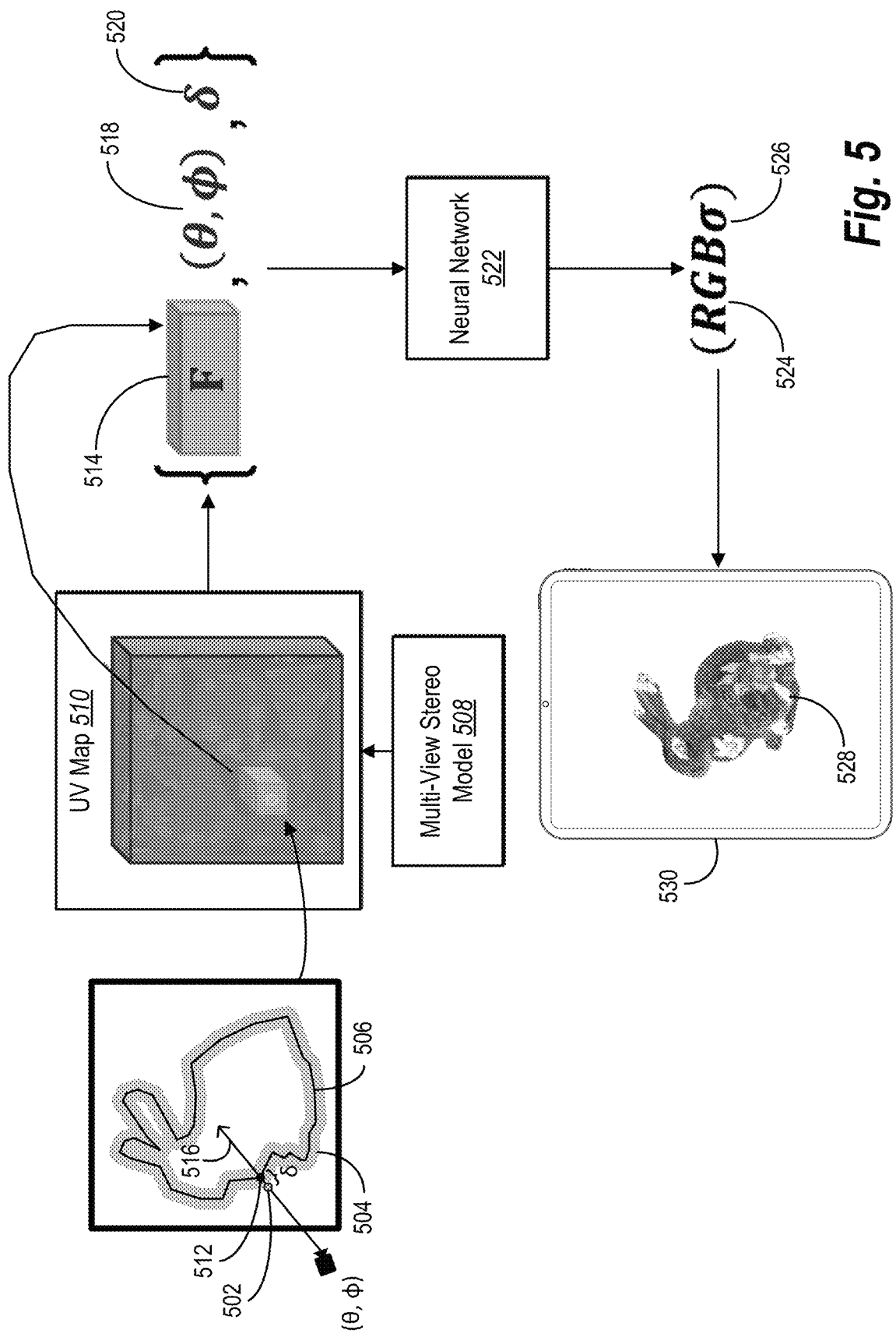
FIG. 5 illustrates a diagram for generating a three-dimensional hybrid mesh-volumetric representation using sample points for a thin volume around a mesh in accordance with one or more embodiments.

As further discussed above, the object representation system 106 utilizes the set of sample points determined using the rays to generate a three-dimensional hybrid mesh-volumetric representation for the digital object. In particular, in some embodiments, the object representation system 106 modifies the thin volume determined using the set of sample points to generate the three-dimensional hybrid mesh-volumetric representation. FIG. 5 illustrates a diagram for generating a three-dimensional hybrid mesh-volumetric representation using sample points around a mesh in accordance with one or more embodiments.

As shown in FIG. 5, the object representation system 106 determines a set of sample points for a thin volume 504 around a mesh 506 generated for a digital object as discussed above with regard to FIG. 4. In one or more embodiments, the object representation system 106 further identifies neural textures represented by feature vectors for the set of sample points. In one or more embodiments, the object representation system 106 modifies the thin volume 504 to include the neural textures of the feature vectors.

Indeed, as shown in FIG. 5, the object representation system 106 utilizes a multi-view stereo model 508 (e.g., the multi-view stereo model used to generate the mesh 506 for the digital object) to generate a UV map 510 for the digital object. In one or more embodiments, the UV map 510 includes UV coordinates of the mesh 506. Further, in some embodiments, the UV map 510 corresponds to a feature map that includes a plurality of feature vectors representing neural textures. In other words, in one or more embodiments, the UV map 510 corresponds to a feature map of learned neural textures (e.g., neural textures generated from the multi-view stereo model 508 having parameters learned during the training process). Accordingly, the neural textures are represented by feature vectors in UV space.

In one or more embodiments, the object representation system 106 determines, for each sample point from the set of sample points, a feature vector using the UV map 510. In particular, in some embodiments, the object representation system 106 determines a feature vector for a corresponding point on the mesh 506 (the closest point on the mesh 506). For example, the UV map 510 can include a two-dimensional representation where coordinates along the two-dimensional map represent locations on a mesh (similar to a two-dimensional map of a globe). The object representation system 106 determines feature vectors corresponding to the UV map 510 that correspond to a matching point on the mesh 506.

For example, as illustrated by FIG. 5, the object representation system 106 identifies a point 512 on the mesh 506 that corresponds to the sample point 502. Additionally, as shown, the object representation system 106 extracts, for the sample point 502, a feature vector 514 corresponding to the point 512 on the mesh 506 using the UV map 510. For instance, in some cases, the object representation system 106 utilizes the UV map 510 to determine the UV coordinates of the point 512 on the mesh 506 and extracts the feature vector 514 from the feature map using the UV coordinates.

As shown in FIG. 5, the object representation system 106 utilizes the feature vector 514 extracted for the sample point 502 to determine a color value 524 (represented by RGB) and a volume density 526 (represented by σ) for the sample point 502. As further shown, the object representation system 106 also utilizes a direction 518 (represented by (θ, φ)) of the ray 516 of the sample point 502 and a distance 520 (represented by δ) between the sample point 502 and the mesh 506 (e.g., the closest distance) to determine the color value 524 and the volume density 526. In one or more embodiments, the object representation system 106 combines (e.g., concatenates) the feature vector 514, the direction 518, and the distance 520 and determines the color value 524 and the volume density 526 using the combination. Further, in some implementations, the distance 520 corresponds to a signed distance.

As indicated in FIG. 5, the object representation system 106 utilizes a neural network 522 to determine the color value 524 and the volume density 526 from the feature vector 514, the direction 518, and the distance 520. In one or more embodiments, the object representation system 106 trains the neural network 522 to generate color values and volume densities. For instance, in some implementations, the object representation system 106 utilizes the neural network 522 to generate predicted color values and/or predicted volume densities for training sample points. The object representation system 106 further compares the predictions to corresponding ground truths (e.g., via a loss function) and modifies parameters of the neural network 522 based on the comparisons to minimize the error of the neural network 522. For instance, in some cases, the object representation system 106 weightedly accumulates the colors of the sample points along a ray as the prediction for the ray color and compares that prediction to the ground truth for modifying the network parameters.

In one or more embodiments, the object representation system 106 similarly determines a color value and volume density for each sample point from the set of sample points. Indeed, in some cases, the object representation system 106 determines a point on the mesh 506 that corresponds to the sample point, determines UV coordinates for the point on the mesh 506 using the UV map 510, extracts a feature vector for that point on the mesh 506 from the feature map using the UV coordinates, and uses the neural network 522 to determine the color value and volume density based on the feature vector, the distance for the sample point, and the direction of the corresponding ray for that sample point. Accordingly, even where some sample points are similar in some values (e.g., direction and feature vector), the object representation system 106 can identify a different combination of color value and volume density for those sample points.

Thus, in one or more embodiments, the object representation system 106 generates a three-dimensional hybrid mesh-volumetric representation 528 for the digital image that includes a plurality of color values and volume densities corresponding to the sample points. In one or more embodiments, the object representation system 106 further modifies the thin volume 504 around the mesh 506 to generate the three-dimensional hybrid mesh-volumetric representation 528. Indeed, in some implementations, the object representation system 106 generates the three-dimensional hybrid mesh-volumetric representation 528 by progressively building and modifying the thin volume 504 around the mesh 506 (e.g., using sample points, then neural textures, then color values and volume densities).

As further shown in FIG. 5, the object representation system 106 renders the three-dimensional hybrid mesh-volumetric representation 528 for display on a client device 530 (or causes the client device 530 to render the three-dimensional hybrid mesh-volumetric representation 528 for display). For example, in one or more embodiments, the object representation system 106 utilizes raymarching to render the three-dimensional hybrid mesh-volumetric representation 528.

Thus, in one or more embodiments, the object representation system 106 generates a representation for a digital object by building a thin volume around a mesh. In particular, the object representation system 106 utilizes the mesh to build the thin volume for the final representation. Accordingly, in some embodiments, the algorithm and acts described with reference to FIGS. 4-5 comprise the corresponding structure for performing a step for generating, from a set of digital images, a three-dimensional hybrid mesh-volumetric representation for a digital object.

By generating a three-dimensional hybrid mesh-volumetric representation for a digital object, the object representation system 106 offers improved accuracy when compared to conventional systems. In particular, the object representation system 106 generates more accurate representations of digital objects, particularly when compared to those that rely solely on mesh representations. Indeed, by building a thin volume around a mesh generated for a digital object, the object representation system 106 mitigates potential errors present within the mesh. Accordingly, the resulting thin volume provides a more accurate representation of the digital object than the underlying mesh.

Further, the object representation system 106 operates with improved efficiency when compared to conventional systems. In particular, by building the thin volume utilizing sample points within a threshold distance of the underlying mesh, the object representation system 106 efficiently generates a volumetric representation without processing an excessive number of samples of the empty areas around a digital object as is done by many conventional systems. Accordingly, the object representation system 106 can generate a volumetric representation for a digital object utilizing fewer computing resources than conventional systems.

Figure 7:
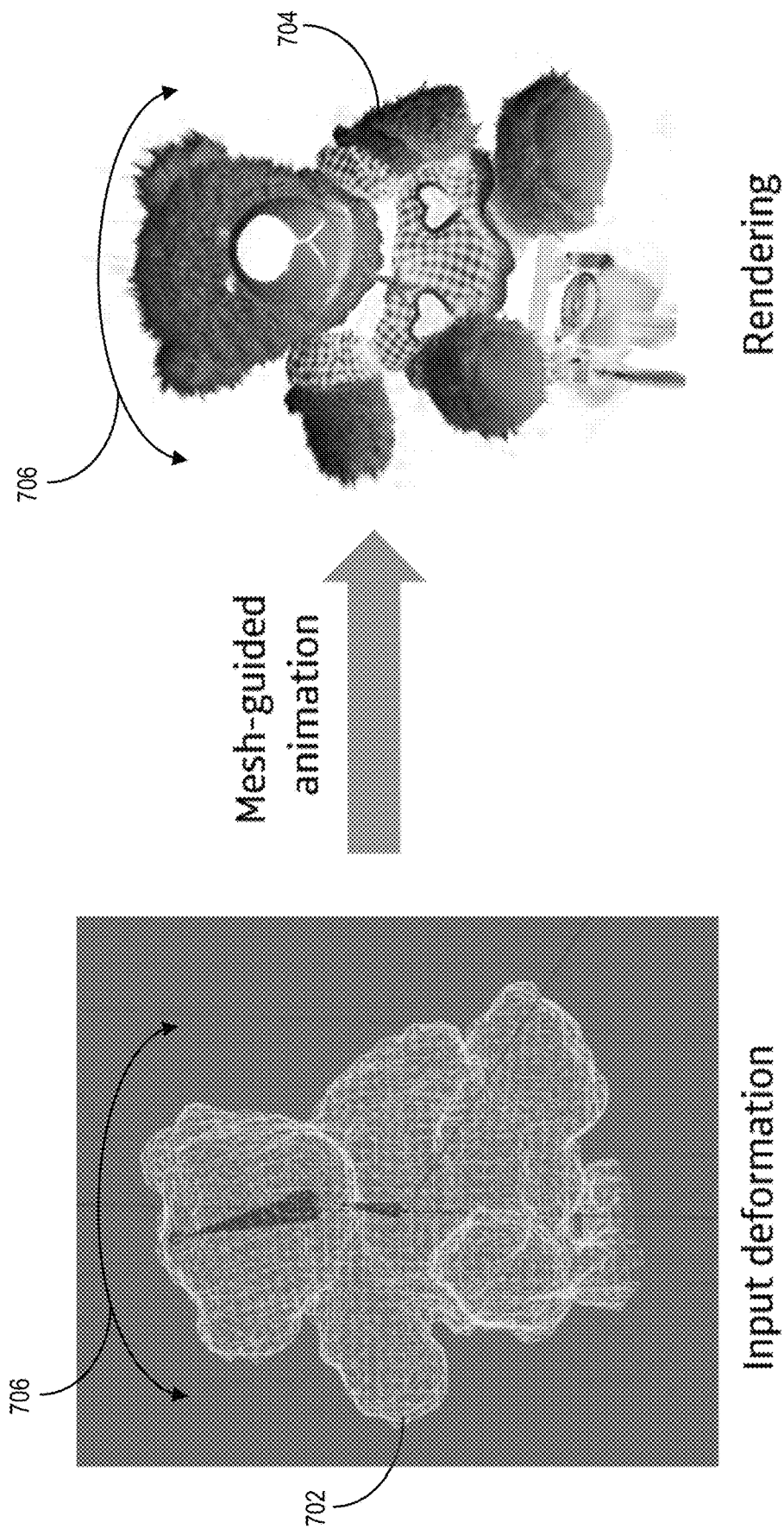
FIG. 7 illustrates animating a three-dimensional hybrid mesh-volumetric representation for a digital object in accordance with one or more embodiments.
Figure 8:
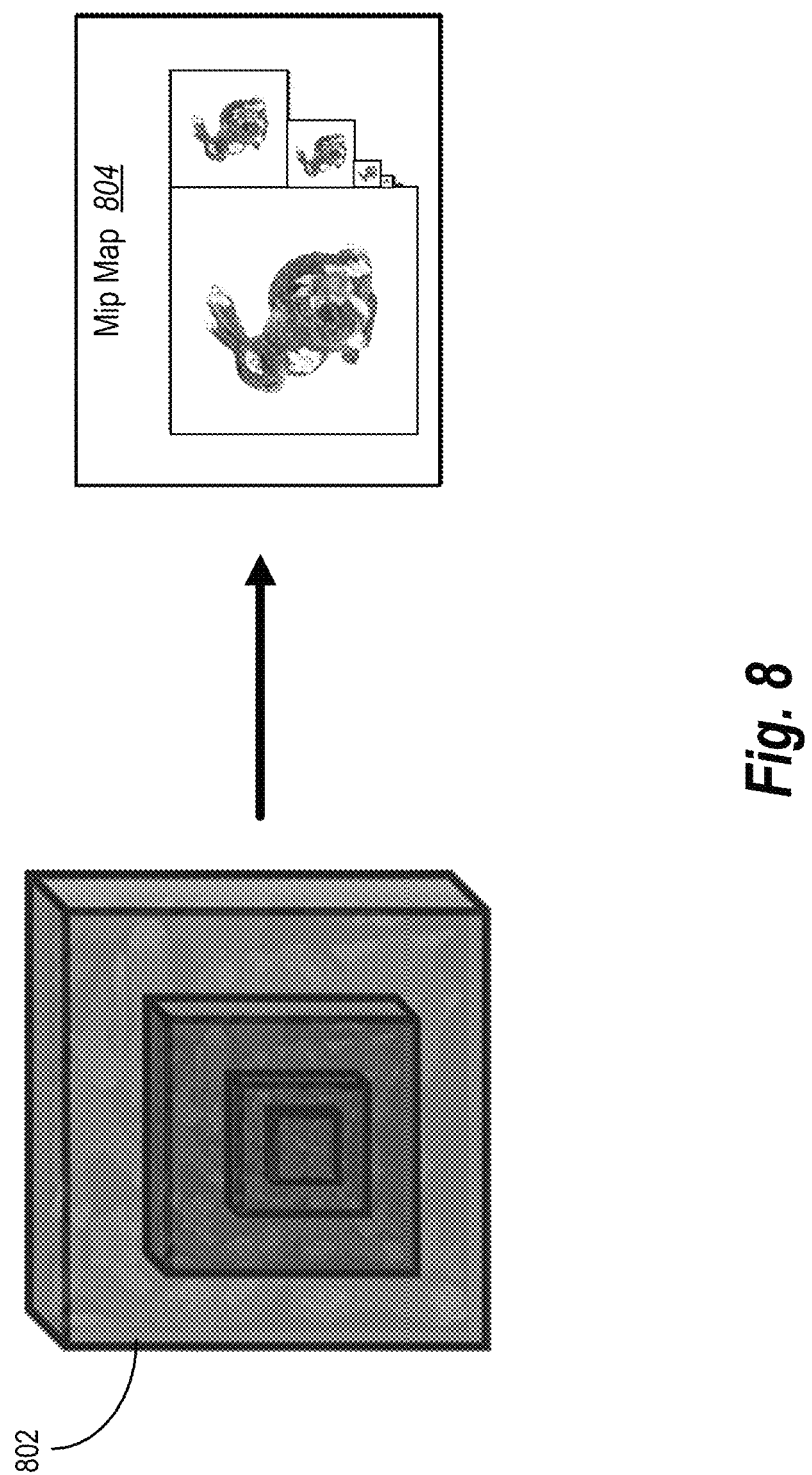
FIG. 8 illustrates utilizing a pyramid of neural textures to support mipmaps in accordance with one or more embodiments.

As previously mentioned, the object representation system 106 provides additional features and applications via the three-dimensional hybrid mesh-volumetric representation generated for a digital object. For example, FIGS. 6-8 illustrate various features and applications provided via a three-dimensional hybrid mesh-volumetric representation for a digital object in accordance with one or more embodiments.

Figure 6:
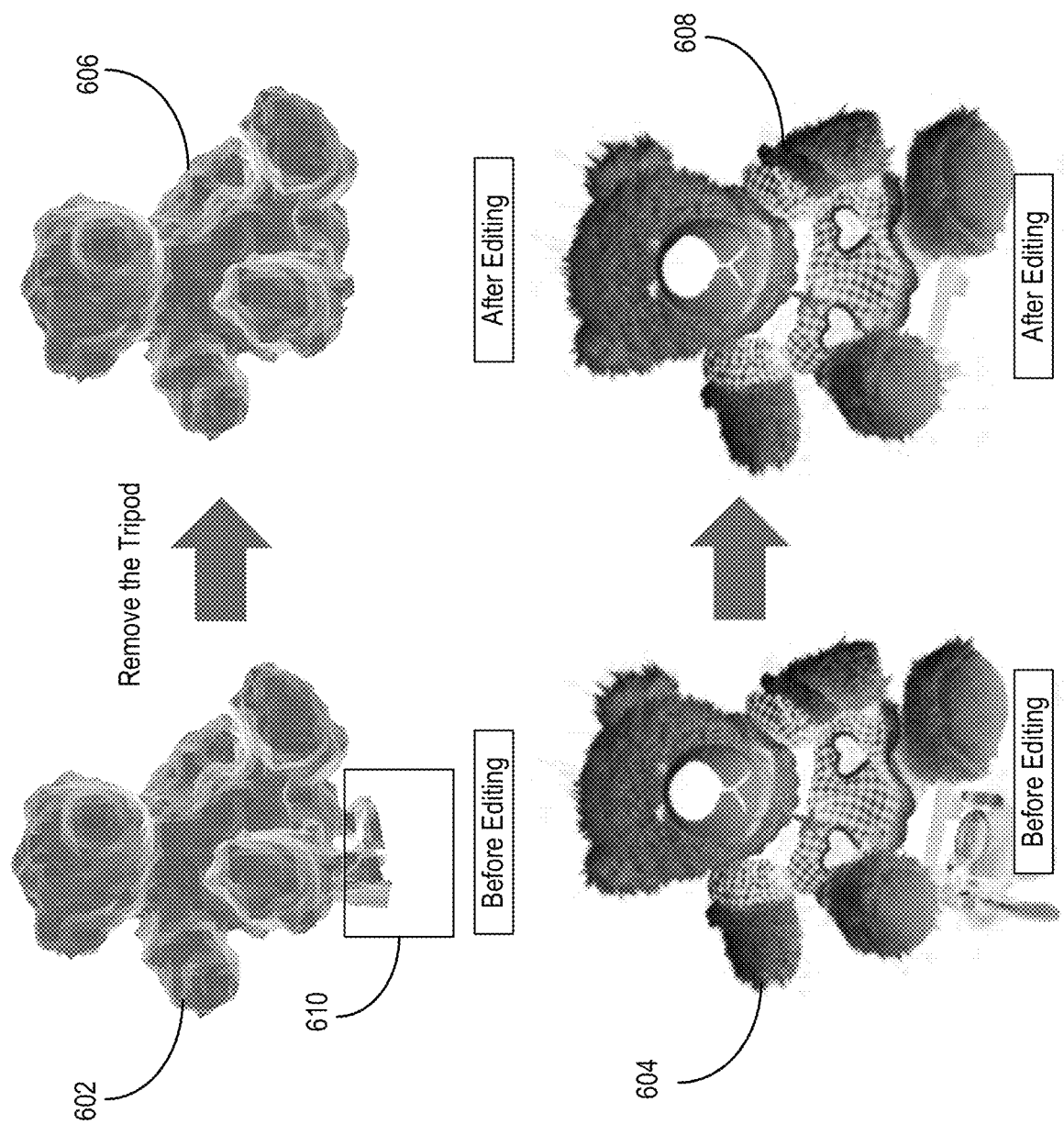
FIG. 6 illustrates modifying a three-dimensional hybrid mesh-volumetric representation for a digital object in accordance with one or more embodiments.

In particular, FIG. 6 illustrates modifying a three-dimensional hybrid mesh-volumetric representation for a digital object in accordance with one or more embodiments. As shown in FIG. 6, the object representation system 106 generates a mesh 602 for a digital object and a three-dimensional hybrid mesh-volumetric representation 604 corresponding to the mesh 602.

As shown in FIG. 6, the object representation system 106 edits the three-dimensional hybrid mesh-volumetric representation 604 by editing the mesh 602. Indeed, as shown, the object representation system 106 generates a modified mesh 606 by removing a portion 610 of the mesh 602. Accordingly, the object representation system 106 generates a modified three-dimensional hybrid mesh-volumetric representation 608 using the modified mesh 606. As illustrated, the modified three-dimensional hybrid mesh-volumetric representation 608 does not include the portion 610 that was removed from the mesh 602.

In one or more embodiments, the object representation system 106 facilitates edits by providing one or more options to edit the three-dimensional hybrid mesh-volumetric representation 604 for display on a client device (e.g., a client device that is displaying the three-dimensional hybrid mesh-volumetric representation 604). In some cases, upon selection of one of the options, the object representation system 106 enables direct user interaction with the three-dimensional hybrid mesh-volumetric representation 604. For example, in some cases, the object representation system 106 receives one or more user interactions for editing the three-dimensional hybrid mesh-volumetric representation 604, modifies the mesh 602 in accordance with the user interaction(s), and then generates the modified three-dimensional hybrid mesh-volumetric representation 608.

In some implementations, however, the object representation system 106 enables user interaction with the mesh 602 itself. For instance, in some embodiments, in response to receiving a selection of an option to edit the three-dimensional hybrid mesh-volumetric representation 604, the object representation system 106 provides the mesh 602 for display on the client device. The object representation system 106 further receives one or more user interactions for editing the mesh 602 and generates the modified three-dimensional hybrid mesh-volumetric representation 608 in accordance with the user interaction(s).

Thus, the object representation system 106 implements more flexible editing of volumetric representations when compared to conventional systems. Indeed, by modifying a three-dimensional hybrid mesh-volumetric representation via modifications to the underlying mesh, the object representation system 106 provides an intuitive, flexible process for changing the appearance of the three-dimensional hybrid mesh-volumetric representation.

FIG. 7 illustrates animating a three-dimensional hybrid mesh-volumetric representation for a digital object in accordance with one or more embodiments. As shown in FIG. 7, the object representation system 106 generates a mesh 702 for a digital object and a three-dimensional hybrid mesh-volumetric representation 704 corresponding to the mesh 702.

As shown in FIG. 7, the object representation system 106 animates the three-dimensional hybrid mesh-volumetric representation 704 by animating the mesh 702. Indeed, as shown, the object representation system 106 deforms the mesh 702 (e.g., the using side-to-side movement 706), which results in a corresponding deformation of the three-dimensional hybrid mesh-volumetric representation 704. In some cases, the object representation system 106 deforms the mesh 702 in response to receiving one or more user interactions with the three-dimensional hybrid mesh-volumetric representation 704. In some implementations, however, the object representation system 106 provides the mesh 702 itself for display on a client device and enables direct user interaction with the mesh 702.

In one or more embodiments, the object representation system 106 deforms the mesh 702 over a plurality of animation frames. For each animation frame, the deformation causes at least some points on the mesh 702 to move to a different location in comparison to the previous animation frame. Accordingly, in one or more embodiments, the object representation system 106 modifies the three-dimensional hybrid mesh-volumetric representation 704 (e.g., generates a new three-dimensional hybrid mesh-volumetric representation) for each animation frame based on the movement of mesh 702.

To illustrate, in one or more embodiments, the object representation system 106 modifies the three-dimensional hybrid mesh-volumetric representation 704 for an animation frame by determining new color values and volume densities for the three-dimensional hybrid mesh-volumetric representation 704 based on the deformation of the mesh 702. For example, in some embodiments, the object representation system 106 generates a new set of rays that intersect the deformed mesh, determines a new set of sample points utilizing the rays, extracts feature vectors for the sample points using UV coordinates determined from the corresponding UV map, and generates color values and volume densities for the sample points from the feature vectors, the ray directions, and the distances between the sample points and the mesh.

Thus, the object representation system 106 further implements more flexible animation of volumetric representations when compared to conventional systems. Indeed, as the three-dimensional hybrid mesh-volumetric representation is registered to the underlying mesh, the object representation system 106 allows for flexible manipulation of the three-dimensional hybrid mesh-volumetric representation via manipulation of the mesh.

FIG. 8 illustrates utilizing a pyramid of neural textures to support mipmaps in accordance with one or more embodiments. Indeed, as shown in FIG. 8, the object representation system 106 generates a pyramid of neural textures 802. For example, in one or more embodiments, the object representation system 106 utilizes a multi-view stereo model to generate at least one UV map and at least one feature map having feature vectors that correspond to the pyramid of neural textures 802. For instance, in some cases, the object representation system 106 utilizes the multi-view stereo model to generate the at least one UV map and the at least one feature map from a set of digital images that portray the corresponding digital object as discussed above with reference to FIG. 3.

As further shown in FIG. 8, the object representation system 106 utilizes the pyramid of neural textures 802 to generate a mipmap 804. In one or more embodiments, the object representation system 106 generates the mipmap 804 by generating a three-dimensional hybrid mesh-volumetric representation of the corresponding digital object that encodes different levels of detail corresponding to the neural textures 802. Indeed, in some cases, the object representation system 106 generates the three-dimensional hybrid mesh-volumetric representation using a corresponding pyramid of color values and volume densities. In some implementations, however, the object representation system 106 generates multiple three-dimensional hybrid mesh-volumetric representations corresponding to the neural textures 802. For example, in some cases, the object representation system 106 generates a three-dimensional hybrid mesh-volumetric representation for each level of the pyramid of neural textures 802, using corresponding color values and volume densities. Thus, in one or more embodiments, the object representation system 106 can provide a representation of a digital object for multiple resolutions.

Figure 9:
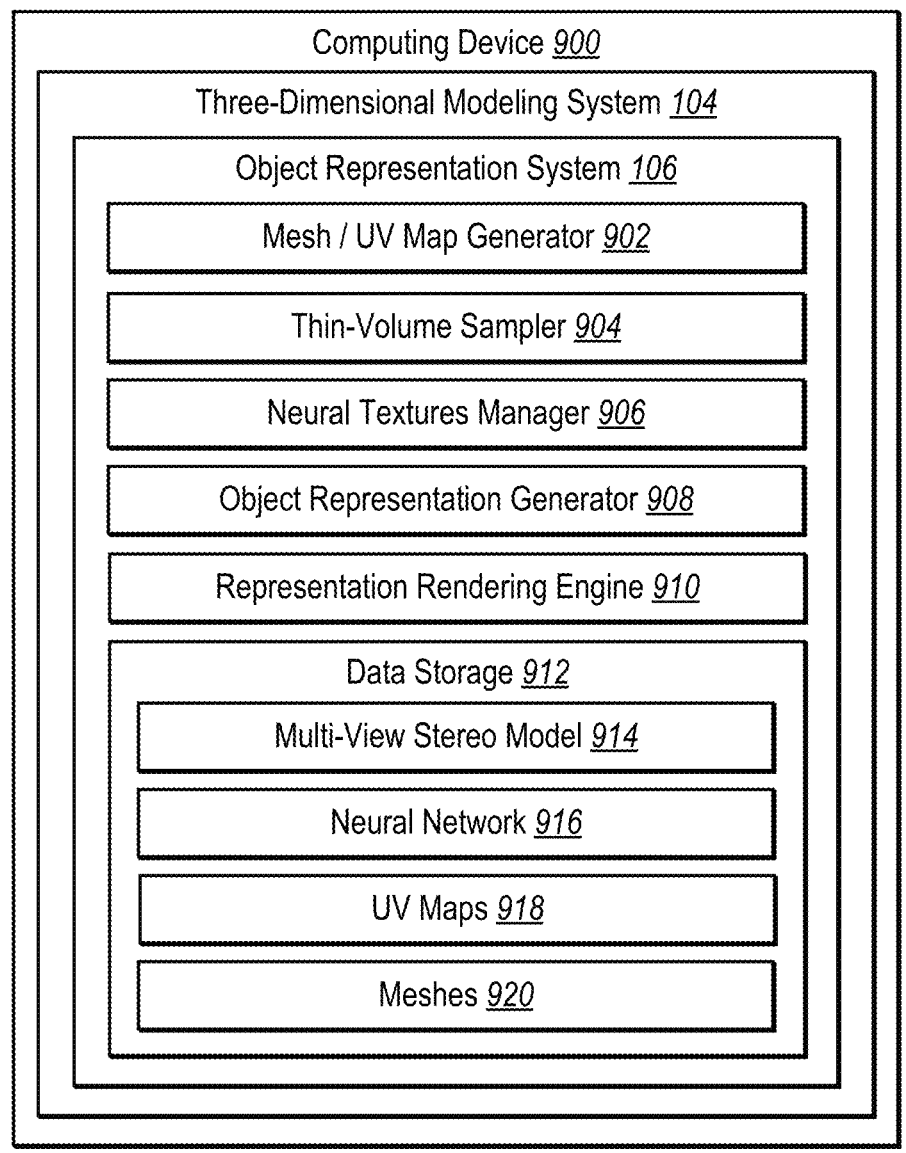
FIG. 9 illustrates an example schematic diagram of an object representation system in accordance with one or more embodiments.

Turning now to FIG. 9, additional detail will now be provided regarding various components and capabilities of the object representation system 106. In particular, FIG. 9 illustrates the object representation system 106 implemented by the computing device 900 (e.g., the server(s) 102 and/or one of the client devices 110a-110n discussed above with reference to FIG. 1). Additionally, the object representation system 106 is also part of the three-dimensional modeling system 104. As shown in FIG. 9, the object representation system 106 includes, but is not limited to, a mesh/UV map generator 902, a thin-volume sampler 904, a neural textures manager 906, an object representation generator 908, a representation rendering engine 910, and data storage 912 (which includes a multi-view stereo model 914, a neural network 916, UV maps 918, and meshes 920).

As just mentioned, and as illustrated in FIG. 9, the object representation system 106 includes the mesh/UV map generator 902. In one or more embodiments, the mesh/UV map generator 902 generates a mesh for a digital object from a set of digital images that portray the digital object. For example, in some cases, the mesh/UV map generator 902 utilizes a multi-view stereo model to generate the mesh from the set of digital images. Further, in some cases, the mesh/UV map generator 902 generates a UV map and/or a corresponding feature map for the digital object from the set of digital images using the multi-view stereo model.

Additionally, as shown in FIG. 9, the object representation system 106 includes the thin-volume sampler 904. In one or more embodiments, the thin-volume sampler 904 determines a set of sample points for a thin volume around the mesh created for a digital object. For example, in some cases, the thin-volume sampler 904 generates a plurality of rays from a source point to the mesh, samples points along the rays, and identifies the points along the rays that are within a threshold distance of the mesh. In some cases, the thin-volume sampler 904 utilizes rays that intersect the mesh. In some implementations, however, the thin-volume sampler 904 also utilizes rays that do not intersect the mesh (e.g., rays that are proximate to the mesh but don't intersect).

As further shown in FIG. 9, the object representation system 106 includes the neural textures manager 906. In one or more embodiments, the neural textures manager 906 extracts neural textures for a set of sample points corresponding to a mesh. For instance, in some implementations, the neural textures manager 906 extracts feature vectors that represent neural textures using the UV map and corresponding feature map generated for the corresponding digital object. In particular, the neural textures manager 906 extracts the feature vectors for the set of sample points determined for the thin volume around the mesh. In one or more embodiments, the neural textures manager 906 modifies the thin volume associated with the sample points using the neural textures.

As illustrated in FIG. 9, the object representation system 106 also includes the object representation generator 908. In one or more embodiments, the object representation generator 908 generates a three-dimensional hybrid mesh-volumetric representation of a digital object. For instance, in some cases, the object representation generator 908 generates the three-dimensional hybrid mesh-volumetric representation using neural textures extracted for the digital object. To illustrate, in some cases, the object representation generator 908 utilizes a neural network to generate color values and volume densities for the three-dimensional hybrid mesh-volumetric representation from the feature vectors representing the neural textures, the directions of the rays corresponding to the sample points, and the distances between the sample points and the mesh.

As shown in FIG. 9, the object representation system 106 further includes the representation rendering engine 910. In one or more embodiments, the object representation system 106 renders a three-dimensional hybrid mesh-volumetric representation generated for a digital object for display on a computing device. In some implementations, the representation rendering engine 910 causes another computing device to render the three-dimensional hybrid mesh-volumetric representation for display.

Additionally, as shown, the object representation system 106 includes data storage 912. In particular, data storage 912 (implemented by one or more memory devices) includes the multi-view stereo model 914, the neural network 916, the UV maps 918, and the meshes 920. In one or more embodiments, the multi-view stereo model 914 stores the multi-view stereo model implemented by the mesh/UV map generator 902 generate a mesh and a UV map from a set of digital images. In some embodiments, the neural network 916 stores the neural network implemented by the object representation generator 908 to generate color values and volume densities in creating a three-dimensional hybrid mesh-volumetric representation for a digital object. In some cases, the UV maps 918 store UV maps and corresponding feature maps generated for digital objects. Likewise, in some instances, the meshes 920 stores the meshes generated for digital objects.

Each of the components 902-920 of the object representation system 106 can include software, hardware, or both. For example, the components 902-920 can include one or more instructions stored on a computer-readable storage medium and executable by processors of one or more computing devices, such as a client device or server device. When executed by the one or more processors, the computer-executable instructions of the object representation system 106 can cause the computing device(s) to perform the methods described herein. Alternatively, the components 902-920 can include hardware, such as a special-purpose processing device to perform a certain function or group of functions. Alternatively, the components 902-920 of the object representation system 106 can include a combination of computer-executable instructions and hardware.

Furthermore, the components 902-920 of the object representation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-920 of the object representation system 106 may be implemented as a stand-alone application, such as a desktop or mobile application. Furthermore, the components 902-920 of the object representation system 106 may be implemented as one or more web-based applications hosted on a remote server. Alternatively, or additionally, the components 902-920 of the object representation system 106 may be implemented in a suite of mobile device applications or "apps." For example, in one or more embodiments, the object representation system 106 can comprise or operate in connection with digital software applications such as ADOBE® CAPTURE or ADOBE® AERO®. The foregoing are either registered trademarks or trademarks of Adobe Inc. in the United States and/or other countries.

FIGS. 1-9, the corresponding text, and the examples provide a number of different methods, systems, devices, and non-transitory computer-readable media of the object representation system 106. In addition to the foregoing, one or more embodiments can also be described in terms of flowcharts comprising acts for accomplishing the particular result, as shown in FIG. 10. FIG. 10 may be performed with more or fewer acts. Further, the acts may be performed in different orders. Additionally, the acts described herein may be repeated or performed in parallel with one another or in parallel with different instances of the same or similar acts.

FIG. 10 illustrates a flowchart of a series of acts 1000 for generating three-dimensional hybrid mesh-volumetric representation for a digital object in accordance with one or more embodiments. FIG. 10 illustrates acts according to one embodiment, alternative embodiments may omit, add to, reorder, and/or modify any of the acts shown in FIG. 10. In some implementations, the acts of FIG. 10 are performed as part of a computer-implemented method. Alternatively, a non-transitory computer-readable medium can store instructions thereon that, when executed by at least one processor, cause the at least one processor to perform operations comprising the acts of FIG. 10. In some embodiments, a system performs the acts of FIG. 10. For example, in one or more embodiments, a system includes one or more memory devices comprising a set of digital images that portray a digital object. The system further includes one or more processors configured to cause the system to perform the acts of FIG. 10.

The series of acts 1000 includes an act 1002 for generating a mesh for a digital object portrayed in a set of digital images. For example, in one or more embodiments, the act 1002 involves generating, from a set of digital images portraying a digital object, a mesh for the digital object utilizing a multi-view stereo model.

Additionally, the series of acts 1000 includes an act 1004 for determining a thin volume around the mesh. To illustrate, in one or more embodiments, the act 1004 involves determining a set of sample points for a thin volume around the mesh.

In one or more embodiments, determining the set of sample points for the thin volume around the mesh comprises generating a ray from a source point to the mesh, the ray intersecting the mesh at one or more locations; and determining a sample point for the set of sample points utilizing the ray. In some implementations, the object representation system 106 determines the sample point for the set of sample points utilizing the ray by: sampling a plurality of points along the ray intersecting the mesh; and determining a point from the plurality of points along the ray that is within a threshold distance of the mesh.

Further, the series of acts 1000 includes an act 1006 for generating a representation for the digital object using the thin volume and the mesh. For instance, in some cases, the act 1006 involves generating, utilizing a neural network, a three-dimensional hybrid mesh-volumetric representation for the digital object utilizing the set of sample points for the thin volume and the mesh. In one or more embodiments, generating, utilizing the neural network, the three-dimensional hybrid mesh-volumetric representation for the digital object comprises determining, for a sample point from the set of sample points, at least one of a color value or a volume density utilizing the neural network.

In one or more embodiments, the object representation system 106 further determines a direction of the ray and a distance between the sample point and the mesh for the digital object. Accordingly, in some implementations, the object representation system 106 generates the three-dimensional hybrid mesh-volumetric representation for the digital object utilizing the set of sample points for the thin volume and the mesh by generating the three-dimensional hybrid mesh-volumetric representation for the digital object utilizing the direction of the ray and the distance between the sample point and the mesh.

In some implementations, the object representation system 106 further generates, from the set of digital images portraying the digital object, a UV map for the digital object utilizing the multi-view stereo model, the UV map corresponding to a plurality of feature vectors representing neural textures. Accordingly, in some embodiments, the object representation system 106 generates, utilizing the neural network, the three-dimensional hybrid mesh-volumetric representation for the digital object utilizing the set of sample points for the thin volume and the mesh by generating the three-dimensional hybrid mesh-volumetric representation for the digital object utilizing the set of sample points for the thin volume, the mesh, and the UV map. To illustrate, in at least one embodiment, the object representation system 106 determines, for a sample point from the set of sample points, a feature vector utilizing the UV map; and generates the three-dimensional hybrid mesh-volumetric representation for the digital object utilizing the set of sample points for the thin volume, the mesh, and the UV map by generating the three-dimensional hybrid mesh-volumetric representation for the digital object utilizing the feature vector for the sample point and the mesh.

In some embodiments, the series of acts 1000 further includes acts for modifying the three-dimensional hybrid mesh-volumetric representation of a digital object. For instance, in some cases, the acts include modifying the mesh for the digital object by removing a portion of the mesh; and generating a modified three-dimensional hybrid mesh-volumetric representation for the digital object utilizing the set of sample points for the thin volume and the modified mesh. In some cases, the acts include generating an animation of the three-dimensional hybrid mesh-volumetric representation using a manipulation of one or more portions of the mesh.

To provide an illustration, in one or more embodiments, the object representation system 106 generates, utilizing a multi-view stereo model, a mesh and a UV map for the digital object utilizing a set of digital images; determines a sample point on a ray within a threshold distance of the mesh; determines, for the sample point, a feature vector using the UV map; and generates, utilizing a neural network, a three-dimensional hybrid mesh-volumetric representation of the digital object from the feature vector, a direction of the ray, and a distance between the sample point and the mesh. In some cases, the object representation system 106 further renders the three-dimensional hybrid mesh-volumetric representation of the digital object for display on a client device.

In one or more embodiments, the object representation system 106 determines the sample point on the ray within the threshold distance of the mesh by: sampling a plurality of points along the ray; and determining a set of sample points for the ray by including, within the set of sample points, one or more points from the plurality of points that are within the threshold distance and excluding, from the set of sample points, at least one point from the plurality of points that is located outside of the threshold distance.

In some cases, the object representation system 106 determines, from the sample point, the feature vector using the UV map by: determining a point on the mesh that corresponds to the sample point; and identifying a feature vector that corresponds to the point on the mesh using the UV map. In some embodiments, identifying the feature vector that corresponds to the point on the mesh using the UV map comprises: determining UV coordinates for the point on the mesh; and determining the feature vector from a feature map that is located at the UV coordinates.

In some instances, the object representation system 106 generates the three-dimensional hybrid mesh-volumetric representation of the digital object from the feature vector, the direction of the ray, and the distance between the sample point and the mesh by determining, for the sample point, a view-dependent color value and a volume density from the feature vector, the direction of the ray, and the distance between the sample point and the mesh.

In some implementations, the object representation system 106 determines an additional sample point on the ray within the threshold distance of the mesh, wherein the sample point is on a first side of the mesh and the additional sample point is on a second side of the mesh; determines, for the additional sample point, an additional feature vector using the UV map; and generates the three-dimensional hybrid mesh-volumetric representation from the feature vector, the additional feature vector, the direction of the ray, and the distance between the sample point and the mesh.

In some embodiments, the object representation system 106 further determines, for the sample point, one or more additional feature vectors using at least one UV map for the digital object, wherein the feature vector and the one or more additional feature vectors correspond to a pyramid of neural textures; and generates a mipmap utilizing the feature vector and the one or more additional feature vectors for the sample point.

To provide another illustration, in one or more embodiments, the object representation system 106 receives a set of digital images that portray a digital object in a plurality of views. Further, the object representation system 106 generates a three-dimensional hybrid mesh-volumetric representation for the digital object using the set of digital images. The object representation system 106 further renders the three-dimensional hybrid mesh-volumetric representation for the digital object for display on a computing device.

In some cases, the object representation system 106 receives, via the computing device, one or more user interactions for manipulating a portion of the three-dimensional hybrid mesh-volumetric representation for the digital object; and modifies the three-dimensional hybrid mesh-volumetric representation in accordance with the one or more user interactions by modifying a portion of a mesh for the digital object that corresponds to the portion of the three-dimensional hybrid mesh-volumetric representation. In some implementations, the object representation system 106 generates a mipmap utilizing a pyramid of neural textures associated with the three-dimensional hybrid mesh-volumetric representation.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
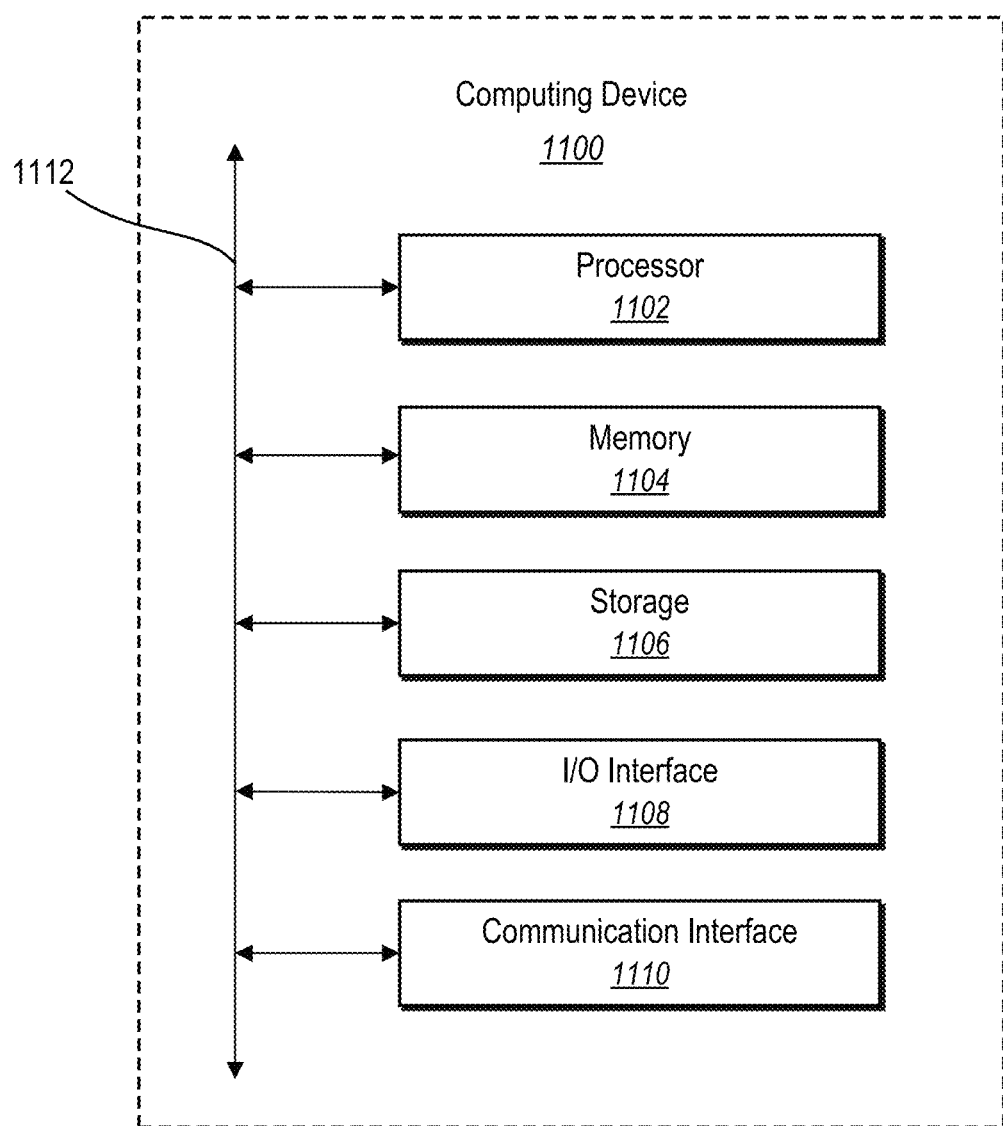
FIG. 11 illustrates a block diagram of an exemplary computing device in accordance with one or more embodiments.

FIG. 11 illustrates a block diagram of an example computing device 1100 that may be configured to perform one or more of the processes described above. One will appreciate that one or more computing devices, such as the computing device 1100 may represent the computing devices described above (e.g., the server(s) 102 and/or the client devices 110a-110n). In one or more embodiments, the computing device 1100 may be a mobile device (e.g., a mobile telephone, a smartphone, a PDA, a tablet, a laptop, a camera, a tracker, a watch, a wearable device). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 including storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause the at least one processor to perform operations comprising:
    generating, from a set of digital images portraying a digital object, a mesh for the digital object utilizing a multi-view stereo model;
    building a thin volume around the mesh by:
        generating one or more rays from a source point to the mesh, the one or more rays intersecting the mesh at one or more locations;
        determining a plurality of sample points positioned off the mesh and positioned on the one or more rays intersecting the mesh; and
        determining a set of sample points for the thin volume that includes one or more sample points from the plurality of sample points that are positioned off the mesh and within a threshold distance of the mesh and excludes at least one sample point from the plurality of sample points that is positioned off the mesh and outside the threshold distance of the mesh,
    wherein the thin volume includes digital data representing features of the digital object within the threshold distance of the mesh; and generating, utilizing a neural network, a three-dimensional hybrid mesh-volumetric representation for the digital object utilizing the set of sample points for the thin volume and the mesh.

2. The non-transitory computer-readable medium of claim 1, wherein building the thin volume for the mesh comprises building the thin volume having a thickness that corresponds to the threshold distance.

3. The non-transitory computer-readable medium of claim 1, wherein determining the plurality of sample points positioned off the mesh and positioned on the one or more rays intersecting the mesh comprises, for a ray of the one or more rays:
sampling one or more points along the ray intersecting the mesh.

4. The non-transitory computer-readable medium of claim 3, further comprising instructions that, when executed by the at least one processor, cause the at least one processor to perform operations comprising:
determining a direction of the ray and a distance between the one or more sample points and the mesh for the digital object; and
generating the three-dimensional hybrid mesh-volumetric representation for the digital object utilizing the set of sample points for the thin volume and the mesh by generating the three-dimensional hybrid mesh-volumetric representation for the digital object utilizing the direction of the ray and the distance between the one or more sample points and the mesh.

5. The non-transitory computer-readable medium of claim 1, further comprising instructions that, when executed by the at least one processor, cause the at least one processor to perform operations comprising:
generating, from the set of digital images portraying the digital object, a UV map for the digital object utilizing the multi-view stereo model, the UV map corresponding to a plurality of feature vectors representing neural textures; and
generating, utilizing the neural network, the three-dimensional hybrid mesh-volumetric representation for the digital object utilizing the set of sample points for the thin volume and the mesh by generating the three-dimensional hybrid mesh-volumetric representation for the digital object utilizing the set of sample points for the thin volume, the mesh, and the UV map.

6. The non-transitory computer-readable medium of claim 5, further comprising instructions that, when executed by the at least one processor, cause the at least one processor to perform operations comprising:
determining, for a sample point from the set of sample points, a feature vector utilizing the UV map; and
generating the three-dimensional hybrid mesh-volumetric representation for the digital object utilizing the set of sample points for the thin volume, the mesh, and the UV map by generating the three-dimensional hybrid mesh-volumetric representation for the digital object utilizing the feature vector for the sample point and the mesh.

7. The non-transitory computer-readable medium of claim 1, further comprising instructions that, when executed by the at least one processor, cause the at least one processor to perform operations comprising generating, utilizing the neural network, the three-dimensional hybrid mesh-volumetric representation for the digital object by determining, for a sample point from the set of sample points, at least one of a color value or a volume density utilizing the neural network.

8. The non-transitory computer-readable medium of claim 1, further comprising instructions that, when executed by the at least one processor, cause the at least one processor to perform operations comprising:
modifying the mesh for the digital object by removing a portion of the mesh; and
generating a modified three-dimensional hybrid mesh-volumetric representation for the digital object utilizing the set of sample points for the thin volume and the modified mesh.

9. The non-transitory computer-readable medium of claim 1, further comprising instructions that, when executed by the at least one processor, cause the at least one processor to perform operations comprising generating an animation of the three-dimensional hybrid mesh-volumetric representation using a manipulation of one or more portions of the mesh.

10. A system comprising:
one or more memory components; and
one or more processing devices coupled to the one or more memory components, the one or more processing devices to perform operations comprising:
generating, utilizing a multi-view stereo model and a set of digital images that portray a digital object, a mesh and a UV map for the digital object;
building a thin volume for the mesh by:
generating one or more rays from a source point to the mesh, the one or more rays intersecting the mesh at one or more locations;
determining a plurality of sample points positioned off the mesh and positioned on the one or more rays intersecting the mesh; and
determining a set of sample points for the thin volume that includes one or more sample points from the plurality of sample points that are positioned off the mesh and within a threshold distance of the mesh and excludes at least one sample point from the plurality of sample points that is positioned off the mesh and outside the threshold distance of the mesh;
determining, for the set of sample points and using the UV map, feature vectors including digital data representing features of the digital object within the threshold distance of the mesh; and
generating, utilizing a neural network, a three-dimensional hybrid mesh-volumetric representation of the digital object from the feature vectors, a direction of the one or more rays, and distances between the set of sample points and the mesh.

11. The system of claim 10, wherein determining, from for the set of sample points, the feature vectors using the UV map comprises:
determining a point on the mesh that corresponds to a sample point from the set of sample points; and
identifying a feature vector that corresponds to the point on the mesh using the UV map.

12. The system of claim 11, wherein identifying the feature vector that corresponds to the point on the mesh using the UV map comprises:
determining UV coordinates for the point on the mesh; and
determining the feature vector from a feature map that is located at the UV coordinates.

13. The system of claim 10, wherein the operations further comprise:
determining, for the set of sample points, one or more additional feature vectors using at least one UV map for the digital object, wherein the feature vectors and the one or more additional feature vectors correspond to a pyramid of neural textures; and generating one or more mipmaps utilizing the feature vectors and the one or more additional feature vectors for the set of sample points.

14. The system of claim 10, wherein determining the plurality of sample points positioned off the mesh and positioned on the one or more rays intersecting the mesh comprises:

determining one or more sample points on a first side of the mesh; and determining one or more additional sample points on a second side of the mesh.

15. The system of claim 10, wherein generating the three-dimensional hybrid mesh-volumetric representation of the digital object from the feature vectors, the direction of the one or more rays, and the distances between the set of sample points and the mesh comprises determining, for a sample point from the set of sample points, a view-dependent color value and a volume density from a feature vector corresponding to the sample point, a direction of a ray corresponding to the sample point, and a distance between the sample point and the mesh.

16. The system of claim 10, wherein the operations further comprise rendering the three-dimensional hybrid mesh-volumetric representation of the digital object for display on a client device.

17. The system of claim 10, wherein building the thin volume for the mesh comprises building the thin volume having a thickness that corresponds to the threshold distance.

18. A computer-implemented method comprising:

receiving a set of digital images that portray a digital object in a plurality of views;

building a thin volume around a mesh for the digital object by:

generating one or more rays from a source point to the mesh, the one or more rays intersecting the mesh at one or more locations;

determining a plurality of sample points positioned off the mesh and positioned on the one or more rays intersecting the mesh; and determining a set of sample points for the thin volume that includes one or more sample points from the plurality of sample points that are positioned off the mesh and within a threshold distance of the mesh and excludes at least one sample point from the plurality of sample points that is positioned off the mesh and outside the threshold distance of the mesh, wherein the thin volume includes digital data representing features of the digital object within the threshold distance of the mesh;

generating, utilizing a neural network, a three-dimensional hybrid mesh-volumetric representation for the digital object utilizing the set of sample points for the thin volume and the mesh; and rendering the three-dimensional hybrid mesh-volumetric representation for the digital object for display on a computing device.

19. The computer-implemented method of claim 18, further comprising:

receiving, via the computing device, one or more user interactions for manipulating a portion of the three-dimensional hybrid mesh-volumetric representation for the digital object; and modifying the three-dimensional hybrid mesh-volumetric representation in accordance with the one or more user interactions by modifying a portion of a mesh for the digital object that corresponds to the portion of the three-dimensional hybrid mesh-volumetric representation.

20. The computer-implemented method of claim 18, further comprising generating a mipmap utilizing a pyramid of neural textures associated with the three-dimensional hybrid mesh-volumetric representation.

* * * * *